United States Patent
Yu

(10) Patent No.: US 8,134,991 B2
(45) Date of Patent: Mar. 13, 2012

(54) METHOD OF AND AN APPARATUS FOR EFFECTING A SMOOTH TRANSITION BETWEEN ADJACENT SYMBOL BURSTS TRANSMITTED IN DIFFERENT MODULATION FORMATS

(75) Inventor: Zhi-Zhong Yu, Reading (GB)

(73) Assignee: Qualcomm Incorporated, San Diego, CA (US)

( * ) Notice: Subject to any disclaimer, the term of this patent is extended or adjusted under 35 U.S.C. 154(b) by 1315 days.

(21) Appl. No.: 10/591,620

(22) PCT Filed: Mar. 4, 2005

(86) PCT No.: PCT/US2005/007113
§ 371 (c)(1),
(2), (4) Date: Jun. 6, 2007

(87) PCT Pub. No.: WO2005/088922
PCT Pub. Date: Sep. 22, 2005

(65) Prior Publication Data
US 2008/0253349 A1    Oct. 16, 2008

Related U.S. Application Data

(60) Provisional application No. 60/550,463, filed on Mar. 4, 2004.

(51) Int. Cl.
*H04J 3/00* (2006.01)
(52) U.S. Cl. ......... 370/345; 370/347; 370/342; 370/208
(58) Field of Classification Search .................. 370/208, 370/342, 347
See application file for complete search history.

(56) References Cited

U.S. PATENT DOCUMENTS

2002/0154620 A1 * 10/2002 Azenkot et al. ............... 370/347
(Continued)

FOREIGN PATENT DOCUMENTS

EP         0397077 B1      4/1997
(Continued)

OTHER PUBLICATIONS

Peter Bode et al., "Combined GMSK and 8PSK Modulator for GSM and EDGE," ISCAS 2003, Proceedings of the 2003 IEEE International Symposium on Circuits and Systems, Bangkok, Thailand, May 25-28, 2003, pp. III-614, vol. 3 of 5, XP002318484.

(Continued)

*Primary Examiner* — Phuoc Doan
(74) *Attorney, Agent, or Firm* — Kenyon S. Jenckes; Sayed H. Beladi

(57) ABSTRACT

A first sequence for a first digital symbol burst is selected to be transmitted, which first sequence comprises a set of end symbols with a first particular symbol pattern. A second sequence for a second digital symbol burst is also selected for transmission after the first digital symbol burst, which second sequence comprises a set of start symbols with a second particular symbol pattern. The first digital symbol burst is modulated in a first modulation format and the second digital symbol burst is modulated in a second modulation format different than the first modulation format. Transmitting the second digital symbol burst starts upon completion of the transmission of the first digital information symbol at an instant so selected that transmission of the end set of bits of the first code sequence is synchronized in time with the start set of bits of the second code sequence.

32 Claims, 6 Drawing Sheets

U.S. PATENT DOCUMENTS

2003/0152023 A1 * 8/2003 Hosur et al. .................. 370/208

FOREIGN PATENT DOCUMENTS

| EP | 0881806 B1 | 2/2005 |
| WO | 03036896 A2 | 5/2003 |
| WO | 2004021659 A1 | 3/2004 |
| WO | 2005055541 A1 | 6/2005 |

OTHER PUBLICATIONS

International Search Report and Written Opinion—PCT/US2005/007113, International Search Authority—European Patent Office—Jan. 8, 2005.

* cited by examiner

METHOD OF AND AN APPARATUS FOR EFFECTING A SMOOTH TRANSITION BETWEEN ADJACENT SYMBOL BURSTS TRANSMITTED IN DIFFERENT MODULATION FORMATS

CROSS-REFERENCE TO RELATED APPLICATION

This application claims benefit of U.S. Provisional Application Ser. No. 60/550,463, filed Mar. 4, 2004, entitled, "Method to Provide a Smooth Transition Between Adjacent GMSK and 8PSK Bursts," the entirety of which is hereby incorporated herein by this reference.

BACKGROUND OF THE INVENTION

I. Field of the Invention

The invention relates to a method of and an apparatus for effecting a smooth transition between adjacent symbol bursts transmitted in different modulation formats. The invention is useful for providing a smooth transition between adjacent GMSK and 8PSK symbol bursts. The invention may be used in an EGPRS system to minimize spurious transmission between adjacent symbol bursts.

II. Description of Related Art

The GSM standard (Global System for Mobile Communications) is a mobile cellular standard that has been used extensively for many years in Europe, Asia and Africa, and, to a lesser extent, in North America. GSM is a TDMA (time division multiple access) system with 8 timeslots per frame and is used for both voice and data operations. In standard GSM the modulation is GMSK (Gaussian Minimum Shift Keying) which has 1 bit/symbol.

As technology has moved on, GSM has evolved in order to keep up. GPRS (General Packet Radio Service) is an extension of GSM in which up to 5 time slots per frame can be used. The time-slots are divided between receive (Rx) and transmit (Tx), for example 4 Rx slots and 1 Tx slot. The EDGE (Enhanced Data rates for GSM Evolution) has also been developed. EDGE uses a higher modulation scheme than the 1 bit/symbol GMSK of GSM. In EDGE, 3 bits/symbol are transmitted. EDGE combined with GPRS is known as EGPRS and is defined by ETSI GSM 05.04.

EGPRS uses two modulation schemes, GMSK and 8PSK (8-ary phase shift keying). The two modulation schemes are different in many ways. The most obvious one is that GMSK has constant amplitude, while 8PSK has variable amplitude. GMSK only modulates the phase and keeps the amplitude constant, while 8PSK modulates both phase and amplitude. One consequence of these differences is that 8PSK has a data transmission rate that is triple that of the GMSK transmitting data rate.

The introduction of EDGE (and GPRS) has enabled a voice call to be made simultaneously with a data call. In practice this requires the mobile station (MS), which is typically a mobile phone, to be able to transmit in GMSK and 8PSK in adjacent time slots. Thus, both modulation schemes will be in the same spectrum and can appear in two adjacent bursts on either the downlink (from base station to mobile station) or the uplink (from mobile station to base station).

In the downlink, the transmitting base station (BS) normally does not ramp down or switch off at end of each time slot or burst, because the BS will need to transmit again in the next time slot. It is desirable for the MS to switch off between transmissions in order to conserve power. However, increasingly there will be two or more adjacent time slots in which the MS will be required to transmit information. Under these circumstances it is more complex to power down at the end of the first burst and power up at the beginning of the next one.

In EGPRS consecutive bursts are separated from each other by a guard period. If the power remains on during the guard period, as it will under the circumstances outlined above, the transmitter has to be controlled carefully in order to minimize interference to others. The EGPRS specification defines a spectrum mask for the transition, which mask is intended to keep spurious emission as low as possible. Although how this is to be achieved is not specified in the standard, the usual approach is to design both the baseband circuitry and the RF circuitry together to satisfy the conditions of the mask. The mask requirements can be readily met if both of the bursts are of the same modulation. Here, the transition can be made smoothly and has been done for some time in GSM base stations even for transitions between different power levels.

However, if the two consecutive bursts are of different modulations, i.e. GMSK followed by 8PSK, or the vice versa, the transition between the two modulations can generate spurious signals at the output stage of the baseband stage of the transmitter, which will be passed on to the RF stage. The resulting RF signal will violate the spectrum mask defined in the standard. While the standard defines the mask to be satisfied, it is silent about how the mask should be satisfied.

As new services are rolled out on the wireless networks there will be increasing demands from users to be able to combine both voice and data calls; the user may decide to make a voice call while surfing the web with the phone in, say, dynamic synchronous transfer mode (DTM). There is therefore a need to address the issue of transitioning between GMSK and 8PSK modulations in adjacent transmission bursts without generating spurious signals outside the bounds of the defined spectrum mask.

SUMMARY OF THE INVENTION

The invention aims to address the above-identified and related problems.

According to one aspect of the invention there is provided a method of effecting a smooth transition between adjacent digital information bursts transmitted in different modulation formats, the method comprising: selecting a first code sequence for a first digital symbol burst to be transmitted, which first sequence comprises a set of end symbols with a first particular symbol pattern; selecting a second code sequence for a second digital symbol burst to be transmitted after the first digital symbol burst, which second sequence comprises a set of start symbols with a second particular symbol pattern; modulating the first digital symbol burst in a first modulation format; modulating the second digital symbol burst in a second modulation format different than the first modulation format; and transmitting the modulated first and second digital symbol bursts, the transmission of the second digital symbol burst starting upon completion of the transmission of the first digital symbol burst at an instant so selected that transmission of the end set of bits of the first code sequence is synchronized in time with the start set of bits of the second code sequence.

According to another aspect of the invention there is provided an apparatus for effecting a smooth transition between adjacent digital information bursts transmitted in different modulation formats, the apparatus comprising: means for selecting a first sequence for a first digital symbol burst to be transmitted, which first sequence comprises a set of end symbols with a particular symbol pattern; means for selecting a second sequence for a second digital symbol burst to be transmitted after the first digital symbol burst, which second sequence comprises a set of start symbols with the particular symbol pattern; means for modulating the first digital symbol burst in a first modulation format and for modulating the second digital symbol burst in a second modulation format different than the first modulation format; and means for transmitting the modulated first and second digital symbol bursts, the transmission of the second digital symbol burst starting upon completion of the first digital information symbol at an instant so selected that transmission of the end set of bits of the first code sequence is synchronized in time with the start set of bits of the second code sequence.

In a further aspect the invention provides a method of effecting a smooth transition between consecutive sequences of digital information transmitted in different modulation formats, the method comprising: selecting a first sequence of digital information to be transmitted with a first phase and a first amplitude in a radio signal; selecting a second sequence of digital information to be transmitted with a second phase and a second amplitude in the radio signal; transmitting the first digital information burst in a first modulation format; and transmitting the second digital information burst in a second modulation format different than the first modulation format, the transmission of the second sequence starting before completion of the first sequence at an instant so selected to minimize the respective differences between the first and second phases and the first and second amplitudes.

The invention also provides an apparatus for effecting a smooth transition between consecutive sequences of digital information transmitted in different modulation formats, the apparatus comprising: means for selecting a first sequence of digital information to be transmitted with a first phase and a first amplitude in a radio signal and for selecting a second sequence of digital information to be transmitted with a second phase and a second amplitude in the radio signal; and means for transmitting the first digital information burst in a first modulation format, and transmitting the second digital information burst in a second modulation format different than the first modulation format, the transmission of the second sequence starting before completion of the first sequence at an instant so selected to minimize the respective differences between the first and second phases and the first and second amplitudes.

The invention provides an apparatus for processing digital symbols prior to transmission of the symbols in two different modulation formats, the apparatus comprising; means for selecting from a set of symbols some of the symbols for modulation in a first modulation format and for selecting others of the symbols for modulation in a second modulation format different than the first modulation format; means for modulating the said some symbols in accordance with the first modulation format and for modulating the said others of the symbols in accordance with the second modulation format; and means for outputting the symbols as bursts for transmission, in which outputting means the burst of symbols in the first modulation format is separated from the burst of symbols in the second modulation format by a guard period comprising guard symbols that include at least one end symbol of the burst of symbols in the first modulation format and at least one symbol of the burst of symbols in the second modulation format.

Thus the invention aims to provide a solution to the above-discussed problems by providing a technique in the baseband that minimizes spurious emissions in the transmitted RF signal. The aim is to make a smooth transition between adjacent GMSK and 8PSK bursts without using any other form of modulation. In the practice of the invention use is made of the fact that specific start and end codes can be applied to each modulation. By selecting a specific time of switching and/or a specific time to start the new modulation depending on the code for each modulation burst, the transition between bursts will be smooth.

One advantage of this approach is that there is no other modulation involved. Another is that there is no added complexity to the transmitter hardware.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION OF EMBODIMENTS OF THE INVENTION

In the following there will be described a method and an apparatus for effecting a smooth transition between adjacent digital data bursts transmitted in different modulation formats. The method and apparatus have particular, but not sole, application to the transition between adjacent GMSK and 8PSK bursts in an EGPRS system.

Figure 1:
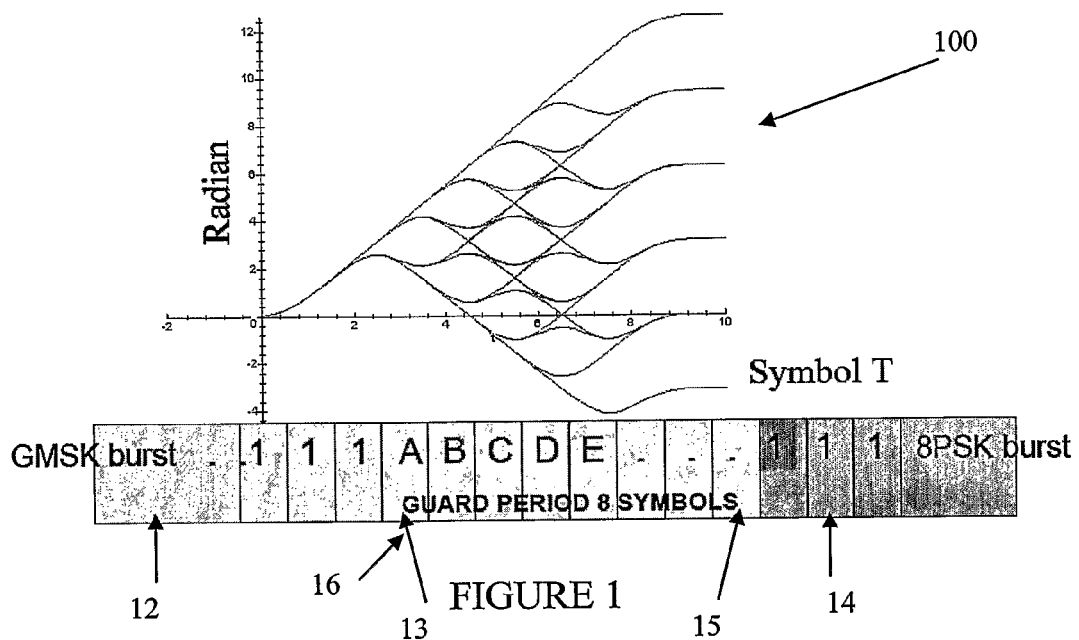
FIG. 1 is a timing diagram showing a portion of an EGPRS signal with a transitional graph shown relative to the signal.

Turning now to the accompanying drawings, FIG. 1 shows a portion of an EGPRS signal 10. The signal 10 comprises a GMSK burst 12 and an 8PSK burst 14. The two bursts 12 and 14 are separated by a guard period 16. In the ETSI standard, the guard period 16 is defined as 8.25 symbols but will be represented as eight symbols (A, B, C, D, E . . . ) herein for the sake of clarity of explanation. Also, it should be noted that while the following description is of the transition from GMSK to 8PSK modulation shown in FIG. 1, the method and apparatus apply equally to a transition from 8PSK to GSMK modulation.

In the embodiments to be described the timing of the GMSK burst and the 8PSK burst is such that at least one end symbol 13 of the GMSK burst and/or at least one start symbol 15 of the 8PSK burst extends into the guard period 16. The patterns of the end bits 13 and the start bits 15 are selected to minimize spurious transmissions when the data are placed on an RF carrier for transmission.

The apparatus in which the method is implemented depends on, among other things, the modulators selected for use and how they are controlled. The following description provides two possible approaches, one based on individually implemented GMSK and 8PSK modulators and the other based on an individual dual-mode modulator.

Figure 2:
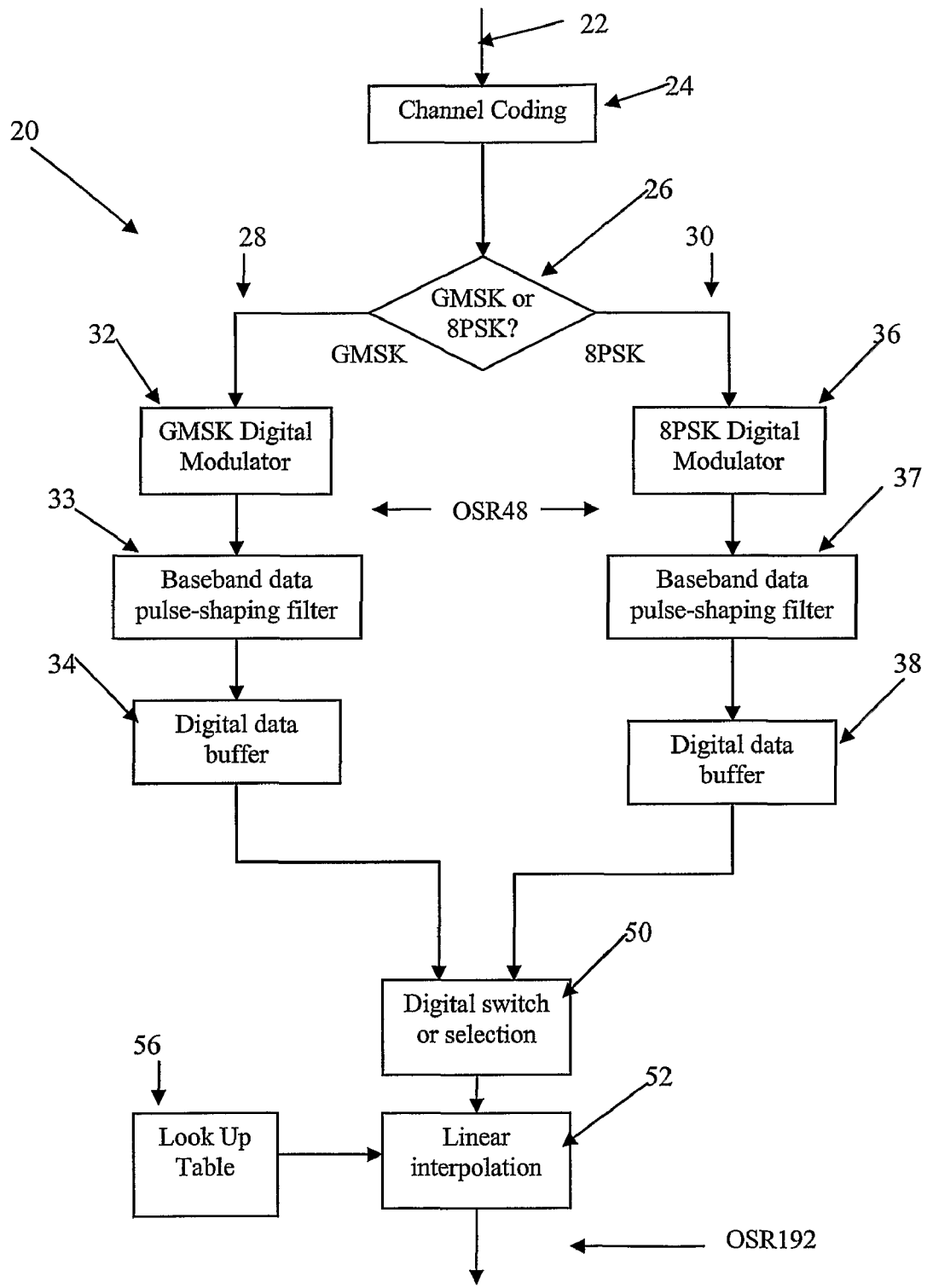
FIG. 2 is a schematic diagram of a GMSK/8PSK dual path baseband modulator.

FIG. 2 of the accompanying drawings represents in schematic form the architecture of a GMSK/8PSK dual baseband modulator 20. Previously conditioned, but unencoded, in-phase (I) and quadrature (Q) data 22, which may represent a voice signal or digital information, is input to a channel coding unit 24. The coding unit 24 codes the I and Q channels in accordance with a predetermined modulation coding scheme. Modulation coding schemes are well known and, since the specific scheme is a matter of design choice, will not be described in any further detail herein. The channel-coded data output from the channel coding unit 24 represent symbols for transmission. The coded data are provided to a divider 26 which directs the data along two paths 28 and 30. Voice signal data are directed along the GMSK path 28 and digital information data are directed along the 8PSK path 30. Thus, voice signal data are subject to GMSK modulation and digital information data are subject to 8PSK modulation. This is consistent with the EGPRS standard. It will, of course be appreciated that other standards may require different modulations to be applied to voice signal data and digital information data.

The path 28 comprises a GMSK digital modulator 32 which applies GMSK modulation at an over-sampling rate of 48 (OSR48) to the coded data from the divider 26 to produce GMSK modulated symbols. The GMSK modulated symbols from the modulator 32 are filtered by a filter 33, which conditions the symbols for further processing. The filtered symbols are buffered in a digital data buffer 34 for subsequent selection. Similarly the path 30 comprises an 8PSK digital modulator 36 which applies 8PSK modulation at an over-sampling rate of 48 to the coded data from the divider 26 to produce 8PSK modulated symbols. The 8PSK modulated symbols are filtered by a filter 37, which conditions the symbols for further processing. The filtered symbols are buffered in a digital data buffer 38 for subsequent selection.

Although the two paths 28 and 30 are shown as separate entities, it will be appreciated that they may be provided as a single, dual function path that applies GMSK modulation to the coded data followed by 8PSK modulation or vice versa. Plainly, one advantage of this single path approach is that it reduces processing overheads.

Figure 3:
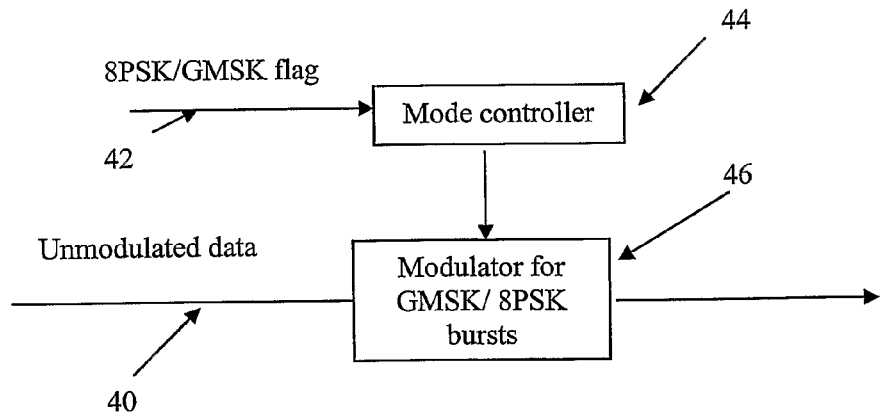
FIG. 3 is a schematic diagram of a GMSK/8PSK single path baseband modulator.

FIG. 3 shows in a simplified form how the single path approach could be implemented. Incoming data 40 would have a flag 42 associated with it indicating whether the data represented a voice signal or an information signal, i.e. whether GMSK modulation or 8PSK modulation is to be applied. The flag 42 would be monitored by a mode controller 44 which would control whether a modulation unit 46 applies GMSK or 8PSK modulation to the incoming data 40.

Returning to FIG. 2, the symbols in the two buffers 34 and 38 are selected for output by a selector 50 depending on whether GMSK or 8PSK modulation is to be used in the transmission of the symbols. The selector 50 may be a switch if the two paths 28 and 30 are physically separate or may be a logical switch if only a single path is used. The selected symbols are then input to a linear interpolator 52 which interpolates the symbols from an over-sampling rate of 48 (OSR48) to an over-sampling rate of 192 (OSR192) as required by the standard.

A look-up table 56 coupled to the linear interpolator 52 contains information regarding combinations of GMSK end symbols 13 (see FIG. 1) and 8PSK start symbols 15 and their timings relative to the guard period 16. The linear interpolator 52 uses the information in the look-up table 56 to add the appropriate start and end symbols to the GMSK and 8PSK bursts and to advance or delay the output of the corresponding pulses for transmission. Thereafter the symbols are input as pulses to an RF modulator for radio transmission.

In this way, the form of the GMSK and 8PSK bursts and their timing is adjusted to minimize spurious signals during the guard period 13 (see FIG. 1) when the symbols are transmitted as a radio frequency (RF) signal.

Although the operational units shown in FIGS. 2 and 3 are presented as separate entities, it should be appreciated that the units may in practice be effected in a single DSP (digital signal processing) processor. Advantages of cost will usually make this desirable since the conversion from conceptually separate functional units to a single DSP unit is well within the scope of knowledge of a DSP designer.

Figure 4:
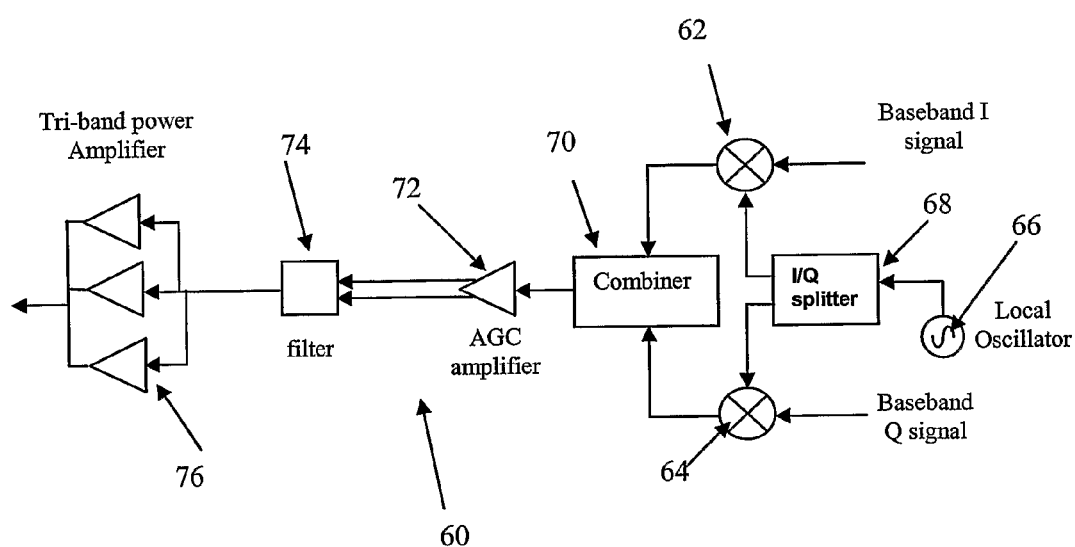
FIG. 4 is a schematic diagram of a of an RF modulator circuit.

FIG. 4 of the accompanying drawings shows an example of an RF modulator circuit 60. The pulses from the interpolator 52 shown in FIG. 2 and input to the RF modulator circuit 60 comprise both in-phase (I) and quadrature (Q) components which are input to respective mixers 62 and 64. A local oscillator 66 generates a carrier signal which is split into I and Q components by an I/Q splitter 68. The I and Q components output from the I/Q splitter 68 are mixed by the respective mixers 62 and 64 with the I and Q pulses from the baseband circuit of FIG. 2. The resulting signals from the mixers 62 and 64 are then combined in a combiner 70, amplified by an AGC (automatic gain control) amplifier 72 and filtered by an RF filter 74 before being output to a radio frequency (RF) power amplifier 76 for radio transmission. The GSM standard operates at different carrier frequencies in different parts of the world. Three different frequencies have been allocated around the world and the RF power amplifier 76 is therefore depicted as a tri-band amplifier.

As with the baseband architecture shown in FIGS. 2 and 3 of the accompanying drawings, there are a number of different ways of implementing the RF stage of the system. One way would be to have separate GMSK and 8PSK transmitter circuits (as per the architecture of FIG. 2). Another would be to have a single transmitter responsive to an 8PSK/GMSK flag (as per the architecture of FIG. 3). Both approaches are equally valid and basically the choice comes down to a matter of preference by the designer.

The GMSK and 8PSK bursts from the filter 54 of FIG. 2 are modulated by the RF modulator circuit 60 of FIG. 4 onto an RF carrier for transmission. Generally the two modulation schemes GMSK and 8PSK have nothing in common with each other; the modulation can start or end at any position. Indeed, without the information provided in the look-up table 56 (see FIG. 2) that is precisely what would happen. The result of this would be to generate spurious emissions in the transmitted RF signal, some of which spurious emissions would be outside the spectrum mask defined by (in this example) the ETSI standard.

It will be appreciated that the reduction in spurious RF emissions realized by above-described conditioning of the GMSK and 8PSK signals may be enhanced by further power control of the transmitted signals by the RF modulator circuit 60. Such power control is well within the skills of those possessed of the requisite knowledge and therefore need not be described in any further detail herein.

Figure 5:
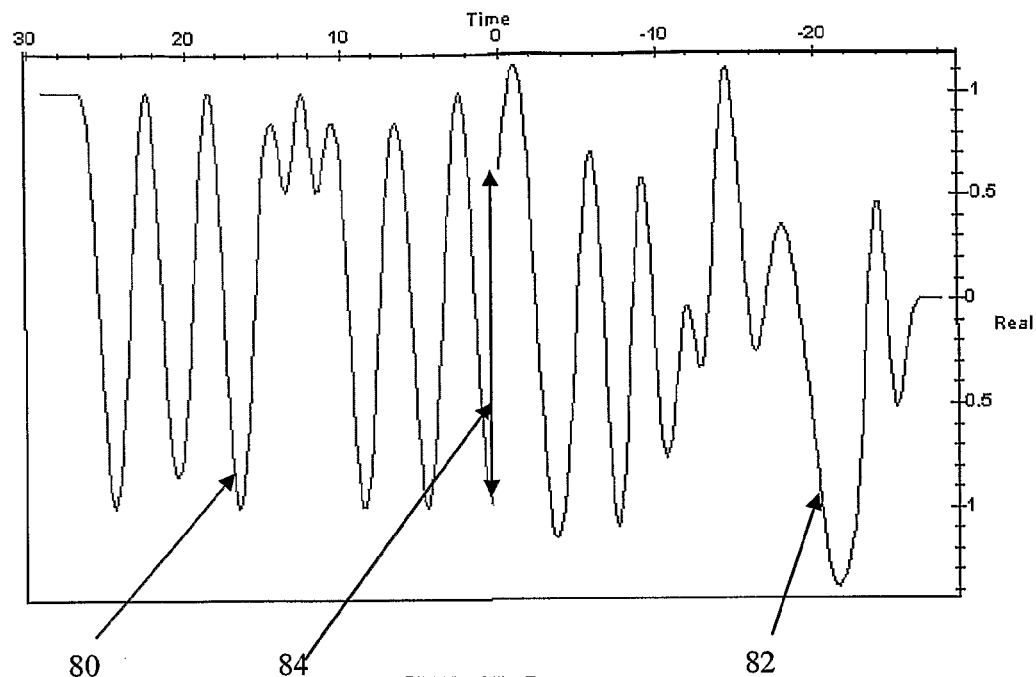
FIG. 5 is a graph showing an example of a discontinuity in the in-phase component of a GMSK signal and an 8PSK signal.
Figure 6:
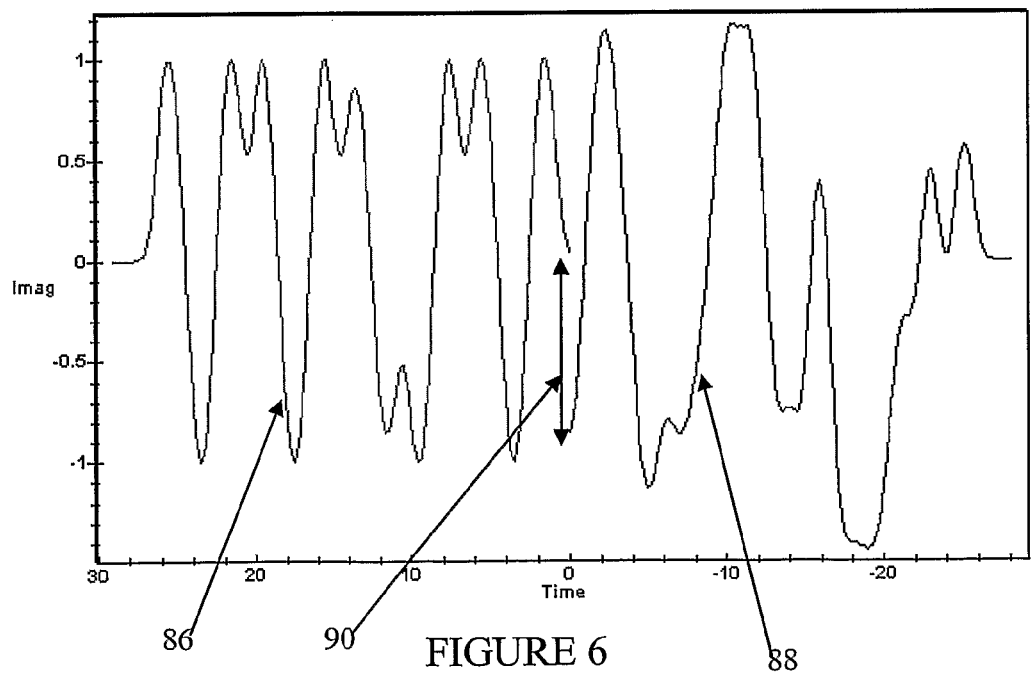
FIG. 6 is a graph showing an example of a discontinuity in the quadrature component of a GMSK signal and an 8PSK signal.

FIGS. 5 and 6 of the accompanying drawings shows one example where a GMSK signal and an 8PSK signal are not in positions where they will join smoothly together. FIG. 5 shows the I (in-phase) component of the GMSK signal 80 and the I (in-phase) component of the 8PSK signal 82, with a disconnect at time 0 (arrow 84). FIG. 6 shows the Q (quadrature) component of the GMSK signal 86 and the Q (quadrature) component of the 8PSK signal 88, with another disconnect (arrow 90) at time 0. The disconnect, or step change, at time 0 in both the I and Q components causes unwanted harmonics to be generated by the RF modulator circuit of FIG. 4.

GMSK and 8PSK modulations can each be represented by the following four parameters, namely: amplitude, rate of change of amplitude, phase, and rate of change of phase. During a transition from one form of modulation to another the time at which modulation of the signals begins is also significant. Thus, a fifth parameter relevant to the transition is the timing of each modulation format.

The two modulations will not meet at the five conditions stated above unless they are controlled so to do. By matching these five parameters in the two modulation formats during a period of transition (i.e. the guard period 16 between consecutive bursts shown in FIG. 1) a smooth transition can be effected from one modulation format to the other. Effecting a smooth transition without the discontinuities shown in the accompanying FIGS. 5 and 6 avoids the generation of spurious emissions in the RF transmission.

Although there are many different combinations of GMSK end symbols, 8PSK start symbols and timings relative to the guard period, it is a simple task to identify combinations that provide a smooth transition. The following description provides by way of example one suitable combination of GMSK end symbols, 8PSK start symbols and timings relative to the guard period.

TABLE 1

| Switching Code | | | | | 1/48 OS Point | Amplitude | Phase Dif. | Dif_arg | Degrees |
|---|---|---|---|---|---|---|---|---|---|
| 0 | 6 | 6 | 0 | 5 | 7 | 1.098419 | 17.11954 | −0.0098 | 0.97703 |
| 0 | 6 | 6 | 0 | 5 | 8 | 1.088899 | 18.11395 | −0.0095 | 0.99441 |
| 0 | 6 | 6 | 0 | 5 | 9 | 1.079712 | 19.1256 | −0.0092 | 1.01164 |
| 0 | 6 | 6 | 0 | 5 | 10 | 1.067387 | 20.05896 | −0.0123 | 0.93336 |
| 0 | 6 | 6 | 0 | 5 | 11 | 1.050093 | 20.87283 | −0.0173 | 0.81387 |
| 0 | 6 | 6 | 0 | 5 | 12 | 1.033017 | 21.71378 | −0.0171 | 0.84095 |
| 0 | 6 | 6 | 0 | 5 | 13 | 1.016171 | 22.5828 | −0.0168 | 0.86902 |
| 0 | 6 | 6 | 0 | 5 | 14 | 0.999566 | 23.48091 | −0.0166 | 0.89811 |
| 0 | 6 | 6 | 0 | 5 | 15 | 0.983216 | 24.40912 | −0.0164 | 0.92821 |
| 0 | 6 | 6 | 0 | 5 | 16 | 0.967132 | 25.36847 | −0.0161 | 0.95935 |
| 0 | 6 | 6 | 0 | 5 | 17 | 0.951329 | 26.35997 | −0.0158 | 0.9915 |
| 0 | 6 | 6 | 0 | 5 | 18 | 0.93582 | 27.38466 | −0.0155 | 1.02468 |
| 0 | 6 | 6 | 0 | 5 | 19 | 0.92062 | 28.44352 | −0.0152 | 1.05887 |
| 0 | 6 | 6 | 0 | 6 | 7 | 1.098205 | 17.10608 | −0.0099 | 0.97517 |
| 0 | 6 | 6 | 0 | 6 | 8 | 1.08865 | 18.09866 | −0.0096 | 0.99258 |
| 0 | 6 | 6 | 0 | 6 | 9 | 1.079426 | 19.10851 | −0.0092 | 1.00985 |

The above Table 1 shows a selection of some of the many 8PSK switching points that are available. Consider the code sequence 06605 at the over-sampling (OS) points 13 and 14. There is an 8PSK modulation point that can smoothly carry on from the GMSK OS point 14. The GMSK modulation point has similar (if not identical) time dependent phase characteristics.

Returning to FIG. 1 a graph 100 placed over the GMSK burst 12, guard period 16 and 8PSK burst 14, shows a number of possible GMSK transitions starting from the sequence 111 that are potential matches to the 8PSK, OS point 14 identified in Table 1. The graph 100 in FIG. 1 shows how the phase angle can change over time depending on whether the symbol changes from a 0 to a 1 during the guard period 16. As shown, the 8PSK burst ends in such a way so that the first symbol of the switching code starts from 0° phase. In order to ensure that there is no discontinuity the start time of the next GMSK modulation burst should be selected so that the GMSK code and the 8PSK code during the guard period are aligned with each other. In other words, the next burst switch code must start from 0° phase. This is, of course, just an example. For burst codes that start with non-zero phases because of payload, non-zero phases should be used during the guard period.

Figure 7:
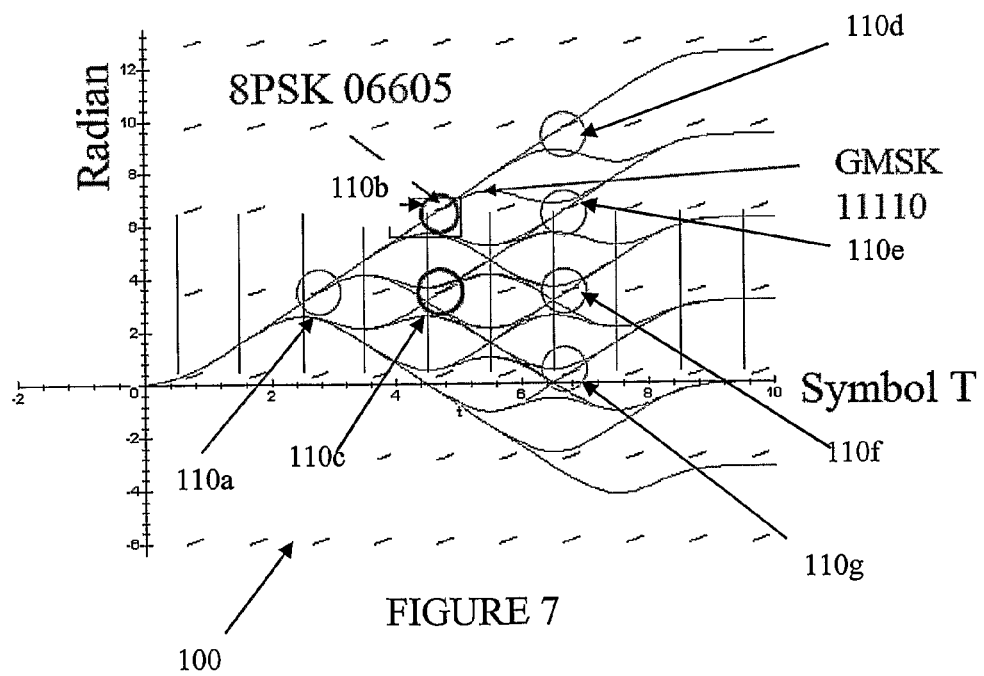
FIG. 7 is a graph showing an 8PSK time/phase pattern superimposed over the time/phase characteristics of a GMSK signal.

In FIG. 7 the equivalent 8PSK pattern has been superimposed over the GMSK time/phase characteristics shown in the graph 100 of FIG. 1. Seven potential transition points have been identified by circles 110a to 110g. As this example is using OSR48, there will be 48 points for each symbol period. It is assumed in FIG. 7 that the point right at the beginning of a symbol is indexed with 0 and the point right at the end of the symbol is indexed as 47 of the current symbol, or 0 of the next symbol.

Figure 8:
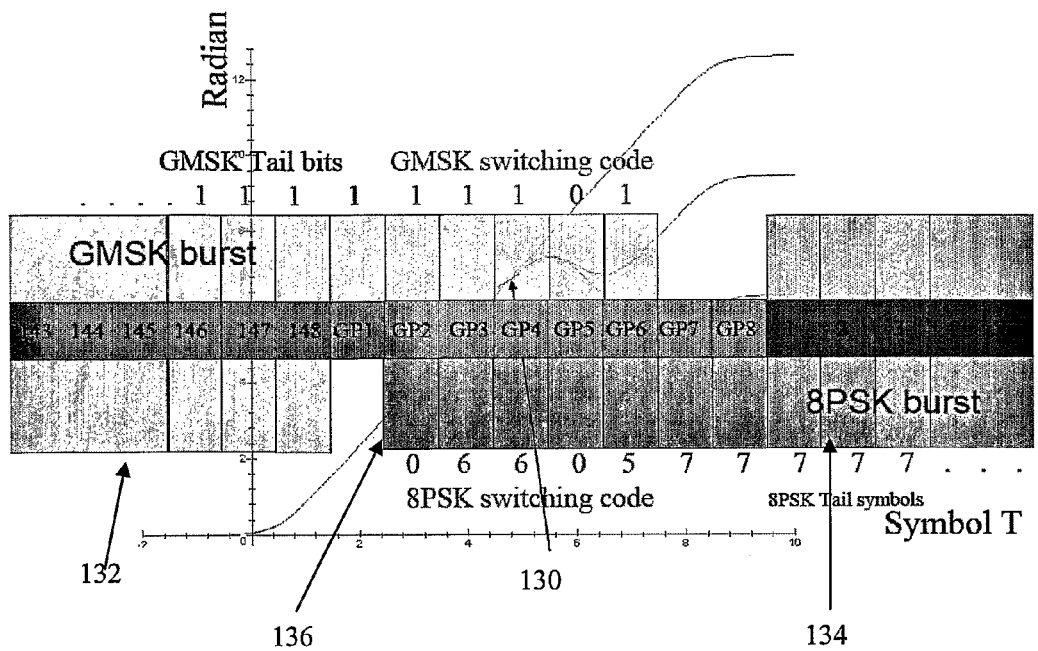
FIG. 8 is a graph detailing a transition at a point in the graph in FIG. 7.

The transition point in FIG. 7 that shows the smoothest transition between the sequence 06605 of 8PSK and the sequence 11110 of GMSK is the point 30b. This is not easy to see in FIG. 7 but can be seen clearly in FIG. 8, which is a graph detailing the transition at point 110b. A phase curve 130 is overlaid with the end part of a GMSK burst 132 (symbols 143 to 148), the beginning part of an 8PSK burst 134 (symbols 1 to 5) separated by a guard period 136 (symbols GP1 to GP8). If the changeover from the GMSK sequence 11110 to the 8PSK sequence 06605 occurs sometime between the 13$^{th}$ and 14$^{th}$ OS points (roughly at time T=4.0 on the FIG. 8 graph) the change will be so small as to minimize any discontinuities between the change from one modulation scheme to another. In practice the switching will occur right after the 13$^{th}$ point. It should be noted that only one form of modulation is used at any given time in the guard period, either GMSK or 8PSK. The modulation changes from one to the other at the instant of switching.

It was noted earlier herein that the GMSK and 8PSK modulations can each be represented by the following four parameters: amplitude, rate of change of amplitude, phase, and rate of change of phase. In this example, the change of amplitude is always from above 1.0 to below 1.0 or vice versa. At the point 110b in FIG. 8, the amplitude of the GMSK burst is 1.0 and that of the 8PSK burst is 0.999566. This is a good match, because the difference (0.000434) between the two amplitudes is less than 1 bit of a 12-bit digital to analog converter (DAC). Similarly the rate of change of amplitude is zero for the GMSK burst and minus 0.0166/step, which is well within the acceptable range for 8PSK modulation. As regards the phases, the GMSK phase is 24.375° and the 8PSK phase is 22.583°, whereas the rate of change of phase is 1.875°/step for GMSK and 0.869°/step for 8PSK, with both phase changes being anti-clock wise.

Figure 9:
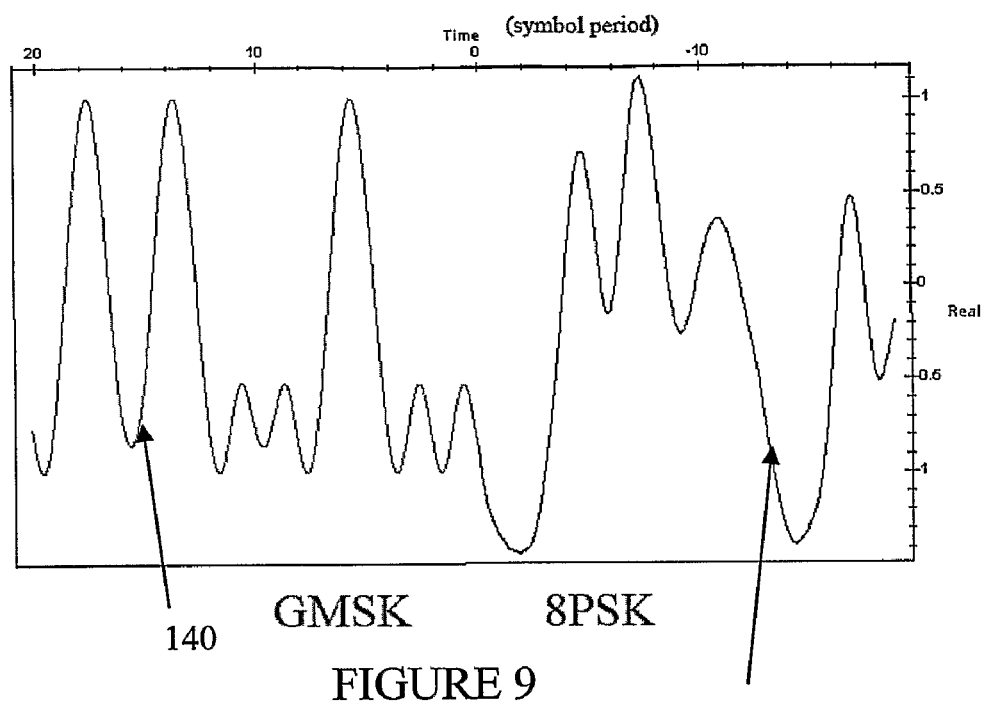
FIG. 9 is a graph showing an example of the in-phase component of a continuous GMSK and 8PSK signal.
Figure 10:
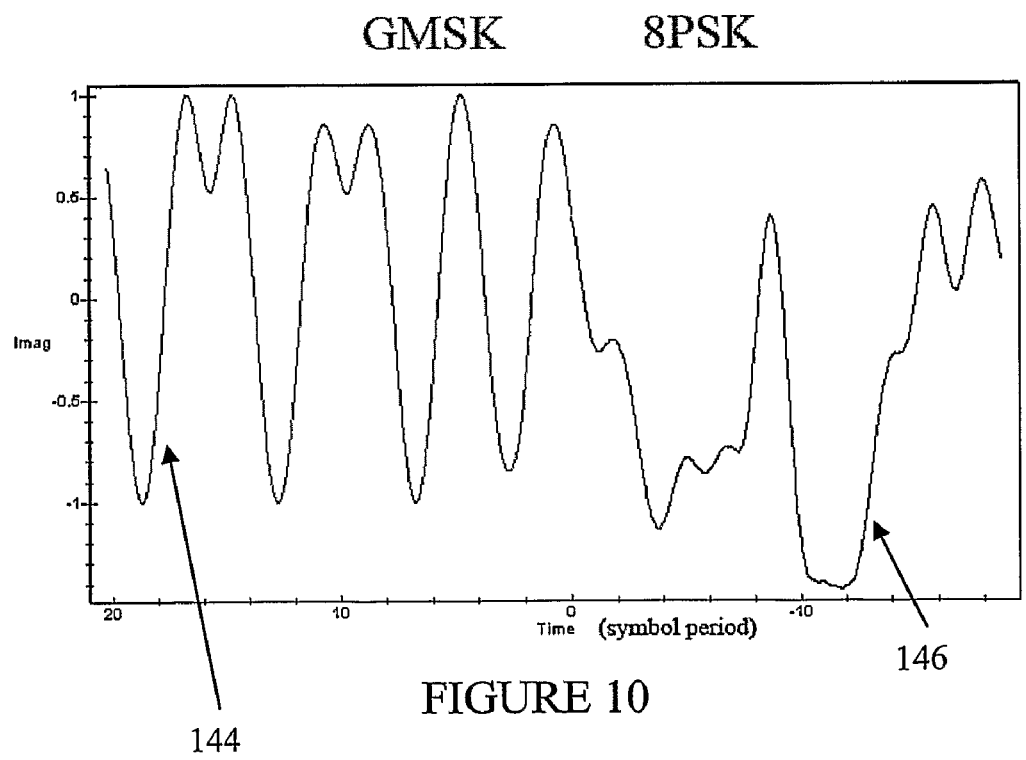
FIG. 10 is a graph showing an example of the quadrature component of a continuous GMSK and 8PSK signal.

Thus the change of gradient of both the in-phase (I) and quadrature (Q) components of the signal are minimal at the transitions. Put another way, the change (at the transition) of both amplitude and phase is minimal, i.e. the effect of selecting the correct switching codes and switching at the right time is to remove the discontinuities from the signal for transmission. This effect can be seen in the graphs shown in FIG. 9 and FIG. 10. FIG. 9, like FIG. 5, shows the I (in-phase) component of a GMSK signal 140 and the I component of an 8PSK signal 142. Similarly, FIG. 10, like FIG. 6, shows the Q (quadrature)

component of a GMSK signal 144 and the Q component of an 8PSK signal 146. However, unlike the graphs of FIGS. 5 and 6, there is no disconnect between the two signals in either of the FIG. 9 or FIG. 10 graphs.

Figure 11:
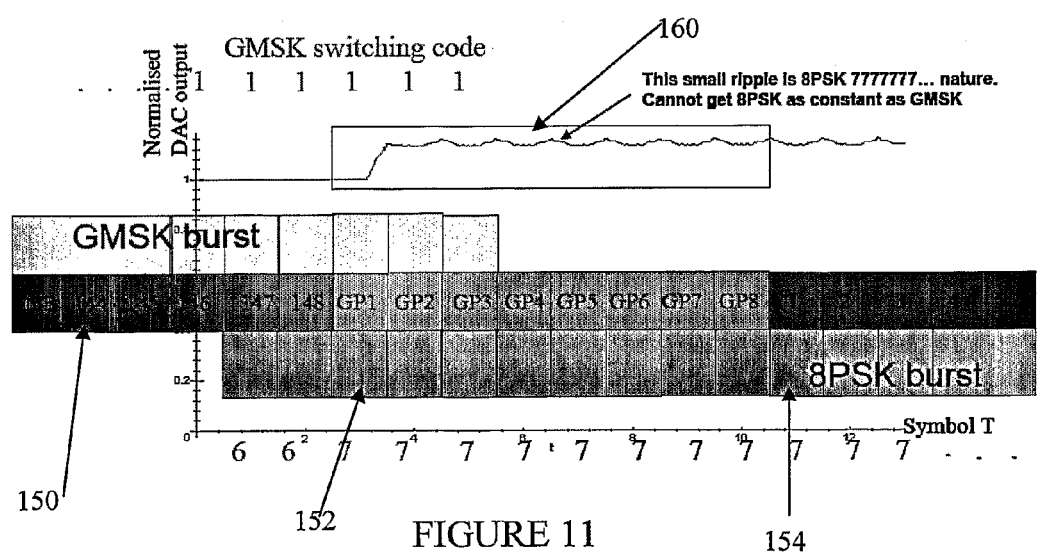
FIG. 11 is a timing diagram showing an example of a transition in an EGPRS signal.

FIG. 11 of the accompanying drawings shows another example of a transition from a GMSK burst 150 with a GMSK switching code defined by tail bits 11111 (bits 147 to GP3). The GMSK tail bits are followed by the remainder of the guard period 152 (bits GP4 to GP8). The remainder of the guard period 152 is filled with 1s. The 8PSK burst 154 (bits 1 to 5, etc.) begins after the end of the guard period 152. As with the previous example described herein above, these codes ensure a smooth transition between the GMSK burst and the 8PSK burst.

The insert 160 in FIG. 11 shows how the baseband output varies during the guard period (GP1 to GP8). Although the guard period is filled with 1s, there is nevertheless a small ripple in the output signal. This is a characteristic of 8PSK which is unable to provide an output that is as constant as the output of a GMSK modulation. It is therefore desirable, but not essential, to delay the 8PSK switching for as long as possible. The switching should occur at GP8, if possible. Of course, priority should be given to ensuring a continuous transition between GMSK and 8PSK and the instant of switching should be selected accordingly. The selection of the switching point should also take account of whether the direction of change is up or down. Switching earlier when the change is up and switching later when the change is down results in the switching occurring at low power rather than high power.

It should be clear from the above description that it is possible to effect a smooth transition between adjacent digital data bursts transmitted in different modulation formats, specifically from GMSK to 8PSK of vice versa. The above-described method and apparatus make use of the guard period, which according to the standard must be low radiation. Arbitrary transition between GMSK and 8PSK fail to meet the mask specified in the standard transitions; spurious transitions would be generated. However, by considered selection of switching codes and the time of switching, the required smooth transition between GMSK and 8PSK can be realized. This may result in a small increase in processing overheads but the increase (typically less than 0.05%) is so small as to be negligible. The embodiments have been described with respect to a mobile station (MS) which will typically be a mobile phone. However, the method and apparatus are equally useful in a base station, or indeed any other transmitter that transmits consecutive bursts of symbols modulated by different modulation formats.

Having thus described the invention by reference to preferred embodiments it is to be well understood that the embodiments in question are exemplary only and that modifications and variations such as will occur to those possessed of appropriate knowledge and skills may be made without departure from the spirit and scope of the invention as set forth in the appended claims and equivalents thereof.

The invention claimed is:

1. A method of effecting a smooth transition between adjacent digital information bursts transmitted in different modulation formats, the method comprising:
    selecting a first code sequence for a first digital symbol burst to be transmitted, which first sequence comprises a set of end symbols with a first particular symbol pattern;
    selecting a second code sequence for a second digital symbol burst to be transmitted after the first digital symbol burst, which second sequence comprises a set of start symbols with a second particular symbol pattern;
    modulating, by a modulator, the first digital symbol burst in a first modulation format;
    modulating the second digital symbol burst in a second modulation format different than the first modulation format; and
    transmitting the modulated first and second digital symbol bursts, the transmission of the second digital symbol burst starting upon completion of the transmission of the first digital symbol burst at an instant so selected that transmission of the end set of bits of the first code sequence is synchronized in time with the start set of bits of the second code sequence.

2. The method of claim 1, wherein the instant is a point in time where the first particular symbol pattern and second particular symbol pattern are closely matched according to one or more criteria.

3. The method of claim 2, wherein:
    the first and second digital symbol bursts each have a respective amplitude and phase; and
    the criteria comprise a close match between at least one of the amplitude of the first and second symbol bursts and the phase of the first and second symbol bursts.

4. The method of claim 2 or 3, wherein:
    the amplitudes of the first and second symbol bursts each have a respective rate of change; and
    the criteria comprise a close match between the rate of change in amplitude of the first and second symbol bursts.

5. The method of claim 1, or 2, or 3, wherein the first and second code sequences are transmitted such that at least one bit of the end set of symbols of the first sequence is transmitted in a guard period between the first and second sequences, and at least one symbol of the start set of the second sequence is transmitted in the guard period.

6. The method of claim 1, or 2, or 3, wherein the first digital symbol burst comprises information representing a voice signal.

7. The method of claim 1, or 2, or 3, wherein the second digital symbol burst comprises information representing a data signal.

8. The method of claim 1, or 2, or 3, wherein the first digital symbol burst is modulated in a Gaussian Minimum Shift Keying (GMSK) modulation format.

9. The method of claim 1, or 2, or 3, wherein the second digital symbol burst is transmitted in an 8-ary phase shift keying (8PSK) modulation format.

10. An apparatus for effecting a smooth transition between adjacent digital information bursts transmitted in different modulation formats, the apparatus comprising:
    means for selecting a first sequence for a first digital symbol burst to be transmitted, which first sequence comprises a set of end symbols with a particular symbol pattern;
    means for selecting a second sequence for a second digital symbol burst to be transmitted after the first digital symbol burst, which second sequence comprises a set of start symbols with the particular symbol pattern;
    means for modulating the first digital symbol burst in a first modulation format and for modulating the second digital symbol burst in a second modulation format different than the first modulation format; and
    means for transmitting the modulated first and second digital symbol bursts, the transmission of the second digital symbol burst starting upon completion of the first digital information symbol at an instant so selected that transmission of the end set of bits of the first code sequence is synchronized in time with the start set of bits of the second code sequence.

11. The apparatus of claim 10, wherein the means for transmitting the modulated first and second digital symbol bursts is arranged to transmit the first and second sequences such that at least one bit of the end set of symbols of the first sequence is transmitted in a guard period between the first and second sequences, and at least one symbol of the start set of the second sequence is transmitted in the guard period.

12. The apparatus of claim 10 or 11, wherein the first digital symbol burst comprises information representing a voice signal.

13. The apparatus of claim 10 or 11, wherein the second digital symbol burst comprises information representing a data signal.

14. The apparatus of claim 10 or 11, wherein the means for modulating is arranged to modulate the first digital symbol burst in a Gaussian Minimum Shift Keying (GMSK) modulation format.

15. The apparatus of claim 10 or 11, wherein the means for modulating is arranged to modulate the second digital symbol burst in an 8-ary phase shift keying (8PSK) modulation format.

16. A method of effecting a smooth transition between consecutive sequences of digital information transmitted in different modulation formats, the method comprising:
   selecting a first sequence of digital information to be transmitted with a first phase and a first amplitude in a radio signal;
   selecting a second sequence of digital information to be transmitted with a second phase and a second amplitude in the radio signal;
   transmitting, by a transmitter, the first sequence of digital information in a first modulation format; and
   transmitting the second sequence of digital information in a second modulation format different than the first modulation format, the transmission of the second sequence starting before completion of the first sequence at an instant so selected to minimize the respective differences between the first and second phases and the first and second amplitudes.

17. An apparatus for effecting a smooth transition between consecutive sequences of digital information transmitted in different modulation formats, the apparatus comprising:
   means for selecting a first sequence of digital information to be transmitted with a first phase and a first amplitude in a radio signal and for selecting a second sequence of digital information to be transmitted with a second phase and a second amplitude in the radio signal; and
   means for transmitting the first sequence of digital information in a first modulation format and for transmitting the second sequence of digital information in a second modulation format different than the first modulation format, the transmission of the second sequence starting before completion of the first sequence at an instant selected to minimize the respective differences between the first and second phases and the first and second amplitudes.

18. An apparatus for processing digital symbols prior to transmission of the symbols in two different modulation formats, the apparatus comprising:
   means for selecting from a set of symbols some of the symbols for modulation in a first modulation format and for selecting others of the symbols for modulation in a second modulation format different than the first modulation format;
   means for modulating the said some symbols in accordance with the first modulation format and for modulating the said others of the symbols in accordance with the second modulation format; and
   means for outputting the symbols as bursts for transmission, in which outputting means the burst of symbols in the first modulation format is separated from the burst of symbols in the second modulation format by a guard period comprising guard symbols that include at least one end symbol of the burst of symbols in the first modulation format and at least one symbol of the burst of symbols in the second modulation format.

19. The apparatus of claim 18, wherein the outputting means comprises a look-up table contains information regarding combinations of end symbols of the first modulation format start symbols of the second modulation format, and relative timings of the start and end symbols, the apparatus further comprising:
   means for conditioning the symbols prior to transmission, which conditioning comprises introducing an advance or a delay to either or both of the burst of symbols in the first modulation format and the burst of symbols in the second modulation format depending on the timing information in the look-up table.

20. The apparatus of claim 18 or 19, wherein the conditioning means comprises:
   an interpolator for interpolating the symbols; and
   a pulse shaping filter for shaping the symbols prior to transmission.

21. The apparatus of claim 18 or 19, wherein the means for modulating comprises a first modulating path for modulating the said some symbols in accordance with the first modulation format and a second modulation path for modulating the said others of the symbols in accordance with the second modulation format.

22. The apparatus of claim 21, wherein each modulation path comprises:
   a modulator for modulating the symbols in the respective one of the first or second modulation format; and
   a buffer for buffering the modulated data from the modulator.

23. The apparatus of claim 22, wherein the outputting means comprises a selector for selecting symbols from the in the first modulation path or from the buffer in the second modulation path.

24. The apparatus of claim 18 or 19, further comprising a radio modulating means for placing the burst of output symbols onto a radio frequency carrier for transmission.

25. An apparatus storing instructions operable, when executed by a processor, to cause the processor to:
   select a first sequence of digital information to be transmitted with a first phase and a first amplitude in a radio signal;
   select a second sequence of digital information to be transmitted with a second phase and a second amplitude in the radio signal;
   transmit the first sequence of digital information in a first modulation format; and
   transmit the second sequence of digital information in a second modulation format different than the first modulation format,
   wherein transmitting the second sequence begins before completing transmission of the first sequence and at a time selected to reduce a difference between the first phase and the second phase and to reduce a difference between the first amplitude and the second amplitude.

26. The apparatus of claim 25, wherein at least one bit of an end set of symbols of the first sequence is transmitted in a guard period between transmitting the first sequence and the second sequence, and wherein at least one symbol of a start set of symbols of the second sequence is transmitted in the guard period.

27. An apparatus to receive signals, comprising:
a receiver configured to receive a radio signal that includes a first sequence of digital information with a first phase and a first amplitude and that further includes a second sequence of digital information with a second phase and a second amplitude, wherein the first sequence is transmitted using a first modulation format and the second sequence is transmitted using a second modulation format different than the first modulation format, wherein transmitting the second sequence begins prior to completing transmission of the first sequence, and wherein a time to begin transmitting the second sequence is selected to reduce a difference between the first phase and the second phase and to reduce a difference between the first amplitude and the second amplitude.

28. The apparatus of claim 27, wherein at least one bit of an end set of symbols of the first sequence is transmitted in a guard period between transmitting the first sequence and the second sequence, and wherein at least one symbol of a start set of symbols of the second sequence is transmitted in the guard period.

29. An apparatus to transmit signals, comprising:
a controller configured to select a first sequence of digital information to be transmitted with a first phase and a first amplitude in a radio signal and further configured to select a second sequence of digital information to be transmitted with a second phase and a second amplitude in the radio signal; and
a transmitter configured to transmit the first sequence of digital information in a first modulation format and further configured to transmit the second sequence of digital information in a second modulation format different than the first modulation format, wherein transmitting the second sequence begins prior to completing transmission of the first sequence and at a time selected to reduce a difference between the first phase and the second phase and to reduce a difference between the first amplitude and the second amplitude.

30. The apparatus of claim 29, further comprising a modulator configured to modulate the first sequence using the first modulation format and further configured to modulate the second sequence using the second modulation format.

31. A system to communicate signals over a wireless communication channel, comprising:
a controller configured to select a first sequence of digital information to be transmitted with a first phase and a first amplitude in a radio signal and further configured to select a second sequence of digital information to be transmitted with a second phase and a second amplitude in the radio signal;
a modulator configured to modulate the first sequence using a first modulation format and further configured to modulate the second sequence using a second modulation format different than the first modulation format; and
a transmitter configured to transmit the modulated first sequence in the first modulation format and further configured to transmit the modulated second sequence in the second modulation format,
wherein transmitting the second sequence begins prior to completing transmission of the first sequence and at a time selected to reduce a difference between the first phase and the second phase and to reduce a difference between the first amplitude and the second amplitude.

32. The system of claim 31, further comprising a receiver configured to receive the transmitted first sequence and the transmitted second sequence.

\* \* \* \* \*